United States Patent [19]
Inazuka

[11] Patent Number: 5,740,482
[45] Date of Patent: Apr. 14, 1998

[54] FINDER SYSTEM FOR CAMERA

[75] Inventor: Masahiro Inazuka, Tokyo, Japan

[73] Assignee: Asahi Kogaku Kogyo Kabushiki Kaisha, Tokyo, Japan

[21] Appl. No.: 783,541

[22] Filed: Jan. 14, 1997

[30] Foreign Application Priority Data

Jan. 16, 1996 [JP] Japan .................. 8-023087

[51] Int. Cl.$^6$ .................................. G03B 17/00
[52] U.S. Cl. .................. 396/296; 396/281; 396/287
[58] Field of Search .................. 396/296, 281, 396/287, 290, 291, 292, 373, 374, 378, 381

[56] References Cited

U.S. PATENT DOCUMENTS

| | | |
|---|---|---|
| 4,140,378 | 2/1979 | Suzuki et al. ............ 396/296 |
| 4,334,220 | 6/1982 | Suzuki et al. ............ 396/296 |
| 4,452,522 | 6/1984 | Murakami et al. ........ 396/296 |
| 4,999,658 | 3/1991 | Kamitani et al. ......... 396/281 |
| 5,019,854 | 5/1991 | Mukai et al. ............. 396/296 |
| 5,270,847 | 12/1993 | Sano . |
| 5,371,569 | 12/1994 | Tanaka . |
| 5,386,260 | 1/1995 | Kirigaya . |
| 5,534,966 | 7/1996 | Miura ..................... 396/296 |

*Primary Examiner*—Russell E. Adams
*Attorney, Agent, or Firm*—Greenblum & Bernstein P.L.C.

[57] ABSTRACT

An LCD panel for displaying information in finder has an input terminal. In order to connect the input terminal and a driving circuit, an FPC board is employed. The LCD panel and the FPC board partially overlap each other so that the terminals of the LCD panel and the FPC board face each other with a cushion inserted therebetween. The cushion includes insulating portions and conductive portions. The overlapping portion of the LCD panel and the terminal are inserted into the slit so that the LCD panel, the cushion and the FPC board firmly contact each other. Thus, the display panel and the FPC board are electrically connected.

24 Claims, 7 Drawing Sheets

FINDER SYSTEM FOR CAMERA

BACKGROUND OF THE INVENTION

The present invention relates to a finder system having a display panel, employed in a camera.

There is known a finder system having a display panel, such as a liquid crystal display (LCD) panel, for displaying information in the finder. The display panel has an input terminal for an electrical input. A flexible printed circuit (FPC) board is employed to connect the input terminal and a driving circuit.

Conventionally, the FPC board is connected to the input terminal of the display panel by thermal compression bonding. However, since the thermal compression bonding necessitates a special machine, it suffers the disadvantage that the manufacturing cost may be increased.

There is also known a finder system in which the display panel and the FPC board is clamped by metal fittings with a cushion inserted between the display panel and the FPC board. However, since it necessitates the metal fittings, it suffers the disadvantages that the number of parts may increased.

SUMMARY OF THE INVENTION

It is therefore an object of the present invention to provide a finder system in a finder for a camera, wherein the display panel and the flexible printed circuit board can be electrically connected in a single manner.

According to an aspect of the invention, an improved display system includes a display panel for displaying information, having an input terminal, a flexible printed circuit board having a connecting terminal, a cushion including insulating portions and conductive portions, and a finder casing having a slit for fixing the display panel in the finder casing. The display panel and the flexible printed circuit board partially overlap each other so that the input terminal and the connecting terminal face each other with a cushion placed therebetween. The overlapping portions of the display panel and the flexible printed circuit board are inserted into the slit so that the input terminal, the cushion and the connecting terminal firmly contact each other, to electrically connect the input terminal and the connecting terminal.

With above constructed display system, the display system and the flexible printed circuit board can be electrically connected without using the thermal compression bonding machine or metal fittings.

In a particular arrangement, the flexible printed circuit board is bent to overlap the opposite surface of the display panel with respect to the input terminal. Further, the overlapping portions are inserted into the slit from the bent portion of the flexible printed circuit board. Thus, the insertion of the overlapping portion is smooth.

It is possible to use a supporting member, which supports the display panel and the flexible printed circuit board in such a manner that the input terminal and the connecting terminal face each other. Thus, the display panel and the flexible printed circuit board are assembled as one unit, which simplifies the assembling operation.

Preferably, the supporting member includes a plate on which the flexible printed circuit board is attached, and a panel frame for supporting the display panel in line with the plate so that the input terminal is placed aside the plate. Consequently, by attaching the flexible printed circuit board to the plate with the connecting terminal protruding from the plate, the connecting terminal faces the input terminal.

Optionally, the flexible printed circuit board is bent at an end of the plate to overlap both surfaces of the plate. Thus, the overlapping portion can be inserted into the slit from the bent portion. Further, the display panel is fit into the panel frame, so that the position of the display panel with respect to the supporting member is determined by simply fitting the display panel to the panel frame.

Conveniently, at least one hooking member is provided to the plate for attaching the flexible printed circuit board to the plate. Further, a positioning device which positions the flexible printed circuit board to the plate is provided. In one case, the positioning device includes at least one boss disposed on the plate and at least one hole formed in the flexible printed circuit board to engage the boss.

It is preferable that a finder frame is unitarily formed with the panel frame. As constructed above, the display panel and the finder frame can be placed close to each other. In a preferred embodiment, the finder frame faces and directly contacts the display panel. With this, the size perpendicular to the display panel can be reduced.

According to another aspect of the invention, a method for electrically connecting a display panel and a flexible printed circuit board includes supporting the display panel and a flexible printed circuit board partially overlapping each other so that input terminal and connecting terminal face each other with the cushion placed therebetween, and inserting the overlapping portions into a slit in such a manner that the input terminal, the cushion and the connecting terminal firmly contact each other to electrically connect the input terminal and the connecting terminal. This method enables to electrically connect the input and connecting terminals without using the thermal compression bonding machine or metal fittings.

DESCRIPTION OF THE ACCOMPANYING DRAWINGS

DESCRIPTION OF THE EMBODIMENTS

An embodiment of the present invention is described with reference to the drawings.

Figure 1:
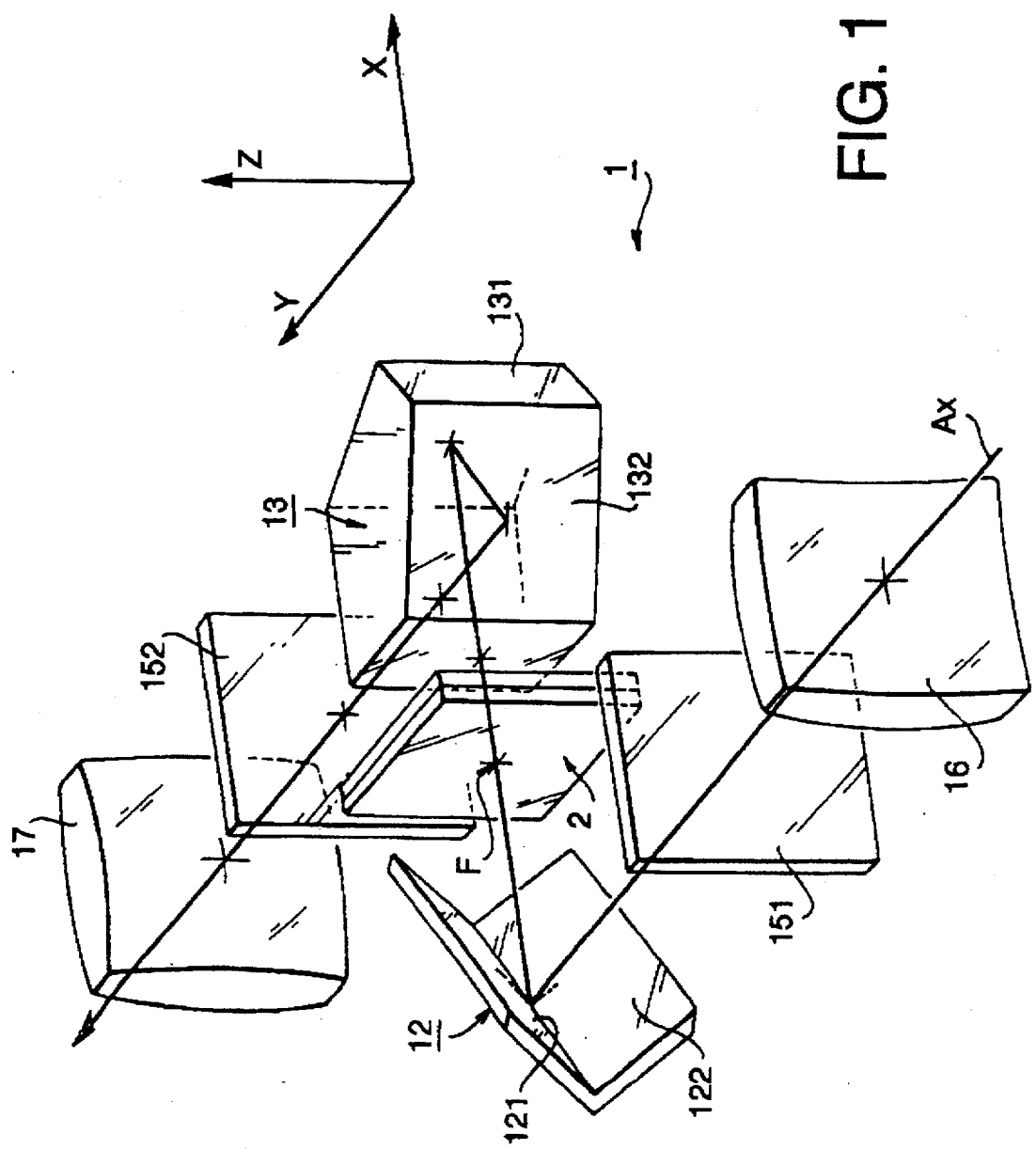
FIG. 1 is a perspective view showing an optical system of a finder system of the embodiment.

FIG. 1 shows an optical system of a real image finder system of the embodiment. The finder 1 has an objective lens 16 and a eyepiece lens 17. An erecting system consisting of a roof mirror 12 and a penta-prism 13 is provided between the objective lens 16 and the eyepiece lens 17. The roof mirror 12 has upper and lower reflecting surfaces 121 and 122 perpendicular to each other. Half of the incident light is reflected by the upper surface 121 and then reflected by the lower surface 122, while the other half is reflected by the lower surface 122 and then by the upper surface 121, so that an inverted and right-left reversed image is produced at the image plane (shown by F). The pentaprism 13 has reflective surfaces 131 and 132 such that the incident light is reflected by the reflective surface 131 and then by the reflective surface 132 to the eyepiece lens 17.

As shown in FIG. 1 a y-axis is defined as a direction of an optical axis of the object lens 16. An x-axis is defined as a direction perpendicular to the y-axis within a surface where the finder system 1 is arranged. A z-axis is defined as a direction perpendicular to the plane formed by the x-axis and the y-axis.

An LCD panel 2 is provided to the image plane (F) of the object lens 17, for displaying information in the finder. The LCD panel 2 may be a TN (Twisted Nematic) type. First and second polarizers 151 and 152 are provided on either sides of the LCD panel 2. The first polarizer 151 is provided between the object lens 16 and the roof mirror 12, the second polarizer 152 is between the pentaprism 13 and the eyepiece lens 17.

Figure 2:
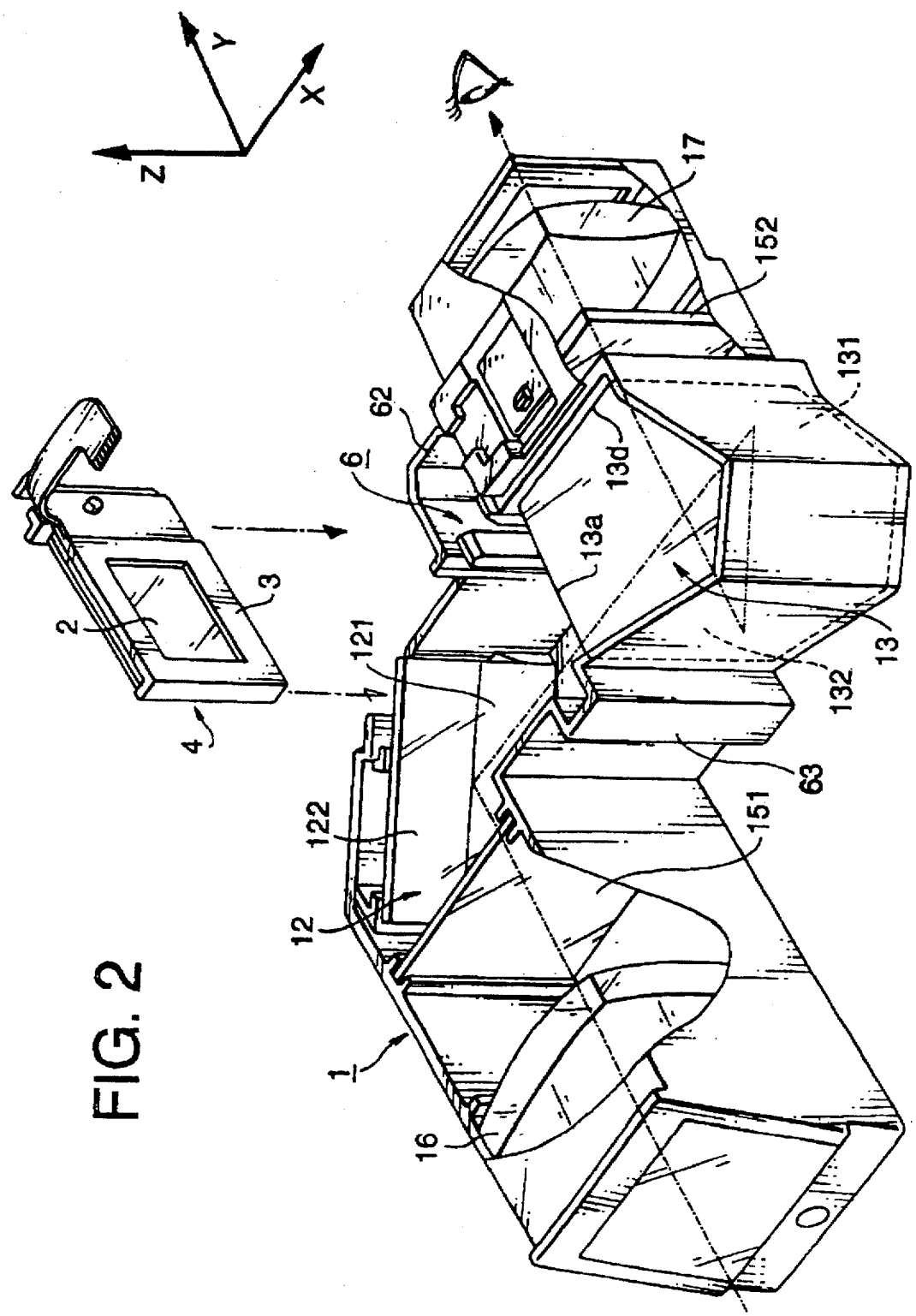
FIG. 2 is a perspective view showing an internal structure of a finder system of the embodiment.

FIG. 2 is a perspective view showing the structure of the finder system 1. As shown in FIG. 2, components of finder system 1 are housed in a finder casing 10. The finder casing 10 has a mounting portion 6, for mounting the LCD panel 2. A finder frame 3 for defining a frame seen by the photographer is provided to the mounting portion 6 together with the LCD panel 2.

The first polarizer 151 allows the light which laterally (x-axis) vibrates to pass, and the second polarizer 152 allows the light which vertically (z-axis) vibrates to pass. The LCD panel 2 is constructed such that an on-segment (to which a voltage is applied) do not change the direction of polarization of incident light and that an off-segment (to which a voltage is not applied) changes the direction of polarization of incident light by 90°. Accordingly, the light incident on the off-segment of the LCD panel 2 can be seen, while the light incident on the on-segment is blocked.

Figure 3:
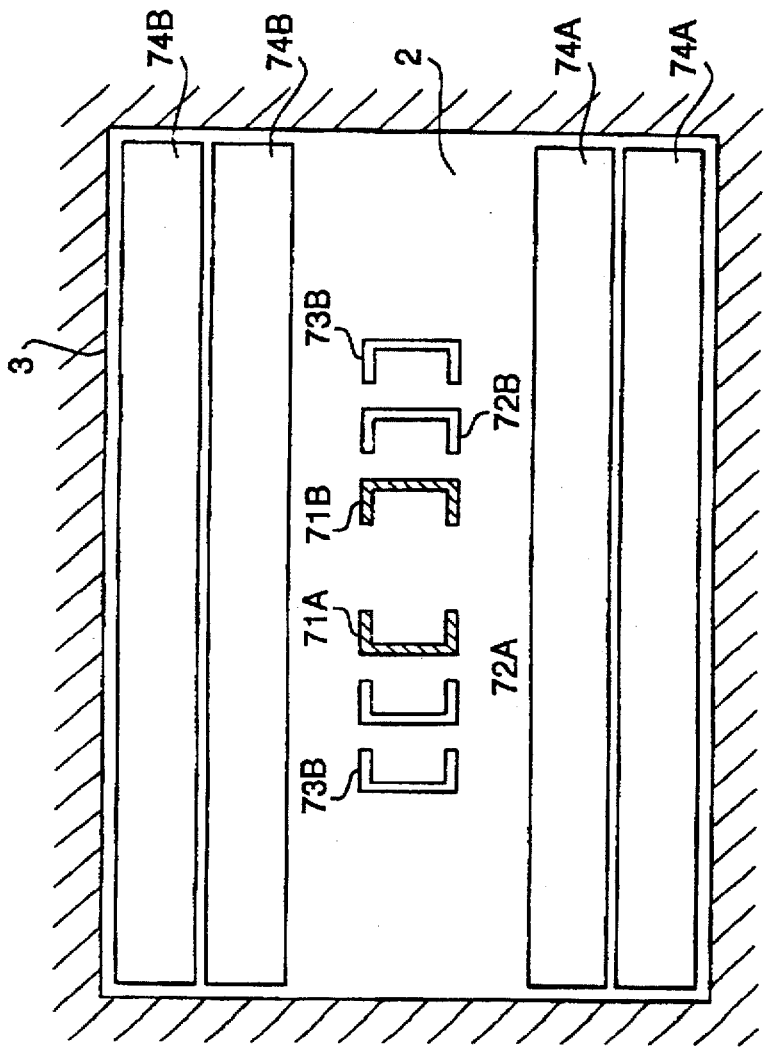
FIG. 3 is a front view showing an example of a display.

FIG. 3 shows an example of the display on the LCD panel 2. A subject can be seen on the LCD panel 2. Three pairs of segments 71A, 71B, 72A, 72B, 73A and 73B are provided for showing auto-focus areas, which can be selected according to the focal length of a zoom lens. When the segments 71A and 71B are on, a pair of inner dark brackets appear in the display as shown in FIG. 2. Similarly, when the segments 72A and 72B or 73A and 73B are on, the middle or outer brackets appear in the display.

Further, segments 74A and 74B are provided to the top and the bottom of the LCD panel 2, for changing the size of the frame seen by the photographer. When a panorama-mode is selected, the segments 74A and 74B are on, which darkens the top and bottom portions of the finder, narrowing the frame seen by the photographer.

Figure 4:
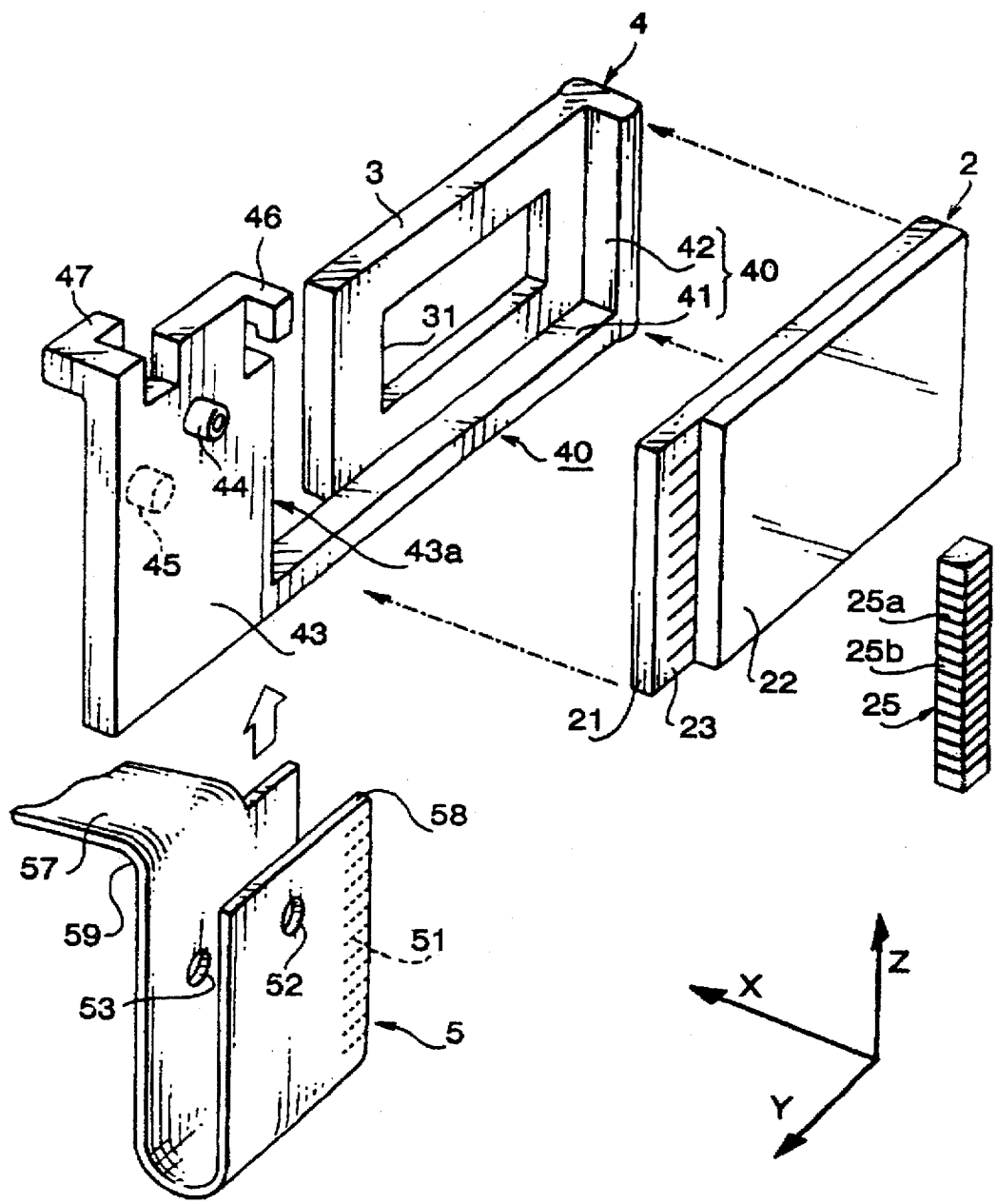
FIG. 4 is a perspective view of a supporting member and an LCD panel.

FIG. 4 is a perspective view of the structure for mounting the LCD panel 2. As shown in FIG. 4, the LCD panel 2 is mounted to the supporting member 4. The supporting member 4 has a rectangular plate 43 and an L-shaped rail 40. The rail 40 consists of a lateral bar 41 and a vertical bar 42. The lateral bar 41 extends from the bottom of a side end 43a of the plate 43 and the vertical bar 42 extends from a longitudinal end of said lateral bar 41 in parallel with the plate 43. The lateral bar 41, the vertical bar 42 and the side end 43a of the plate 43 constitute a panel frame for supporting the LCD panel 2.

The finder frame 3 is a rectangular plate which lower end is unitarily formed with the lateral bar 41 and a side end is unitarily formed with the vertical bar 42. The finder frame 3 has a rectangular opening 31 for defining finder seen by the photographer.

The LCD panel 2 has laminated two glass plates 21 and 22 with a liquid crystal material and segments inserted therebetween. One glass plate 21 is longer in lateral size than the other glass plate 22. One lateral side portion of the longer glass plate 21 sticks out the shorter glass plate 22, where an input terminal 23 for driving the segments is formed.

In order to connect the input terminal 23 and a driving circuit (not shown), a flexible printed circuit (FPC) board 5 is employed. The FPC board 5 is a flexible plastic board having a printed circuit formed thereon. The FPC board 5 is bent in U-shape thereby to overlap both surfaces of the plate 43. The flexible circuit board 5 has a connecting terminal 51 (shown by dotted line in FIG. 4) on the inner surface, to be connected to the input terminal 23 of the LCD panel 2.

A cushion 25 is placed on the input terminal 23 of the LCD panel 2. The cushion 25 is a rectangular rubber having insulating layers 25a and conductive layers 25b alternately displaced in the longitudinal direction, for electrically connecting the input terminal 23 and the connecting terminal 51. The pitch of the insulating layers 25a is narrower than the pitch of the input terminal 23 of the LCD panel 2, for preventing two or more lines of the input terminal 23 are from being connected to one line of the connecting terminal 51.

Figure 5:
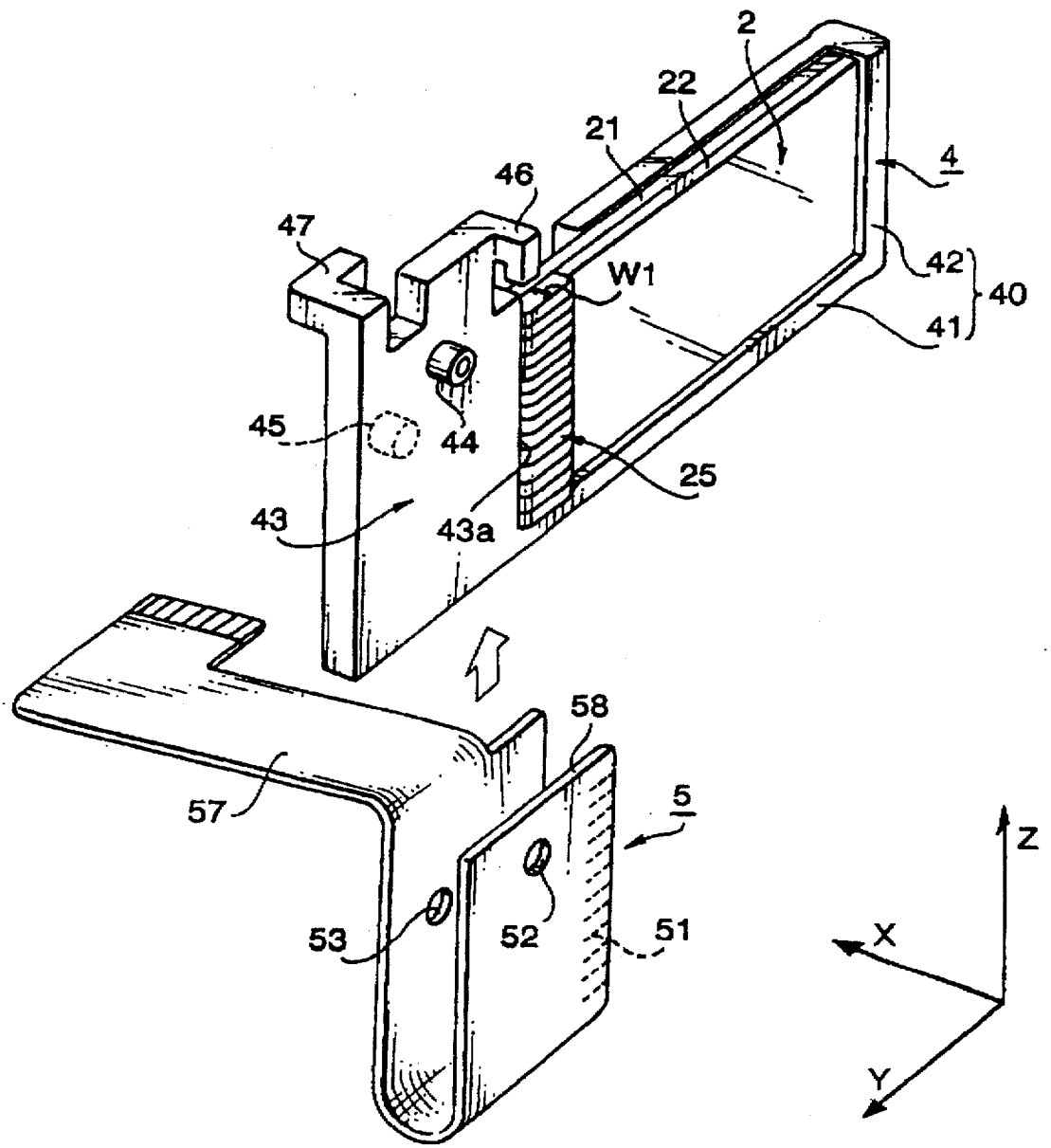
FIG. 5 is a perspective view of a supporting member to which an LCD panel is mounted.

FIG. 5 is a perspective view showing the supporting member to which the LCD panel 2 is mounted. The LCD panel 2 is fit to the Danel frame (consisting of the L-shaped rail 40 and the side end 43a of the plate 43), which determines the position of the LCD panel 2 with respect to the supporting member 4. The longer glass plate 21 faces the finder frame 3 and the input terminal (FIG. 4) is placed aside the side 43a of the plate 43.

The thickness of the LCD panel 2 is smaller than the L-shaded rail 40 (bars 41 and 42), so that the LCD panel 2 does not stick out a plane of a front surface of the plate 43. The thickness of the cushion 25 is set so that the cushion 25 sticks out a plane of the front surface of the plate 43 by a certain amount.

Figure 6:
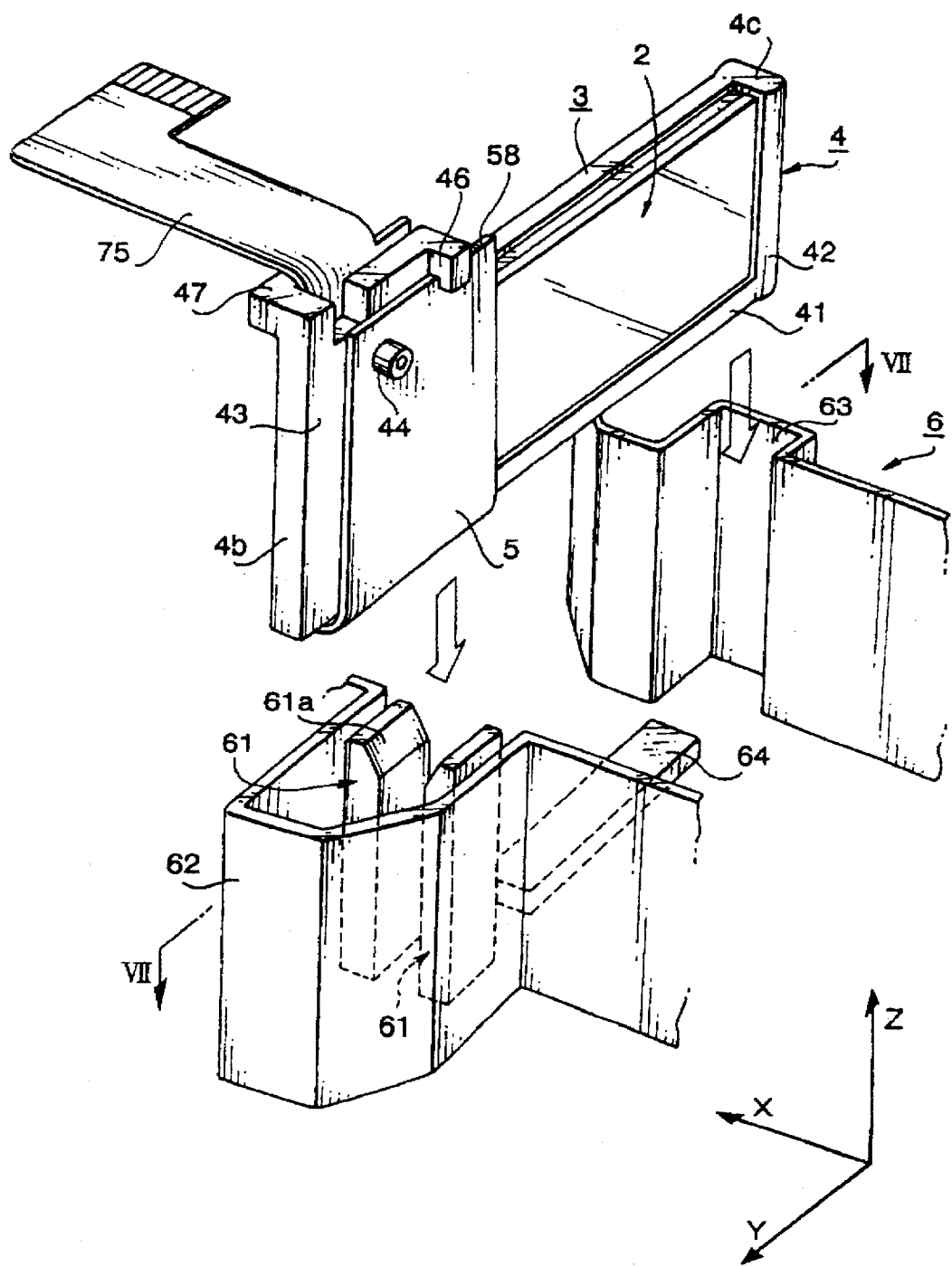
FIG. 6 is a perspective view of a supporting member to which an LCD panel and an FPC board are mounted.

In order to attach the FPC board 5 to the supporting member 4, two hook members 46 and 47 are provided at the top of the block 43. The front hook member 46 projects frontward (to the right in FIG. 4) and bent downward, to hold a front upper end 58 of the FPC board 5 from above. The rear hook member 47 projects rearward (to the left in FIG. 4) and bent laterally, on which an extending portion of the FPC board 5 extends rearward (as shown in FIG. 6). Thus, the FPC board 5 is attached to the front and rear surfaces of the plate 43.

Further, in order to determine the position of the FPC board 5 with respect to the supporting member 4, two bosses 44 and 45 are formed on the front and rear surfaces of the plate 43. Bosses 44 and 45 are respectively fit to bores 52 and 53 formed on the FPC board 5, which determines the position of the FPC board 5 with respect to the plate 43.

Thus, the relative position of the LCD panel 2 to the FPC board 5 is determined by the supporting member Accordingly, when the FPC board 5 is attached to the plate 43 of the supporting member 4, the input terminal 23 and the connecting terminal 51 are accurately aligned with each other.

FIG. 6 shows a supporting member 4 to which the LCD panel 2 and the FPC board 5 are mounted. As shown in FIG. 6, the LCD panel 2, the FPC board 5 and the supporting member 4 are assembled as a unit.

The supporting member 4 is mounted to the mounting portion 6 in the finder casing 10 (FIG. 2). The mounting portion has a pair of grooves 62 and 63 both extending vertically and facing each other. Both lateral side portions 4b and 4c of the supporting member 4 are respectively inserted into the grooves 62 and 63 from above as shown by arrows.

A vertically extending slit 61 is provided in the groove 62. When the lateral side portions 4b and 4c of the supporting member 4 are respectively inserted into the grooves 62 and 63, the FPC board 5 is inserted into the slit 5. An insertion opening of the slit 5 has tapered end 61a, for enabling easy insertion of the FPC board 5. Since the FPC board 5 is inserted into the slit 6 from the bent portion, the FPC board 5 can be smoothly inserted.

Figure 7:
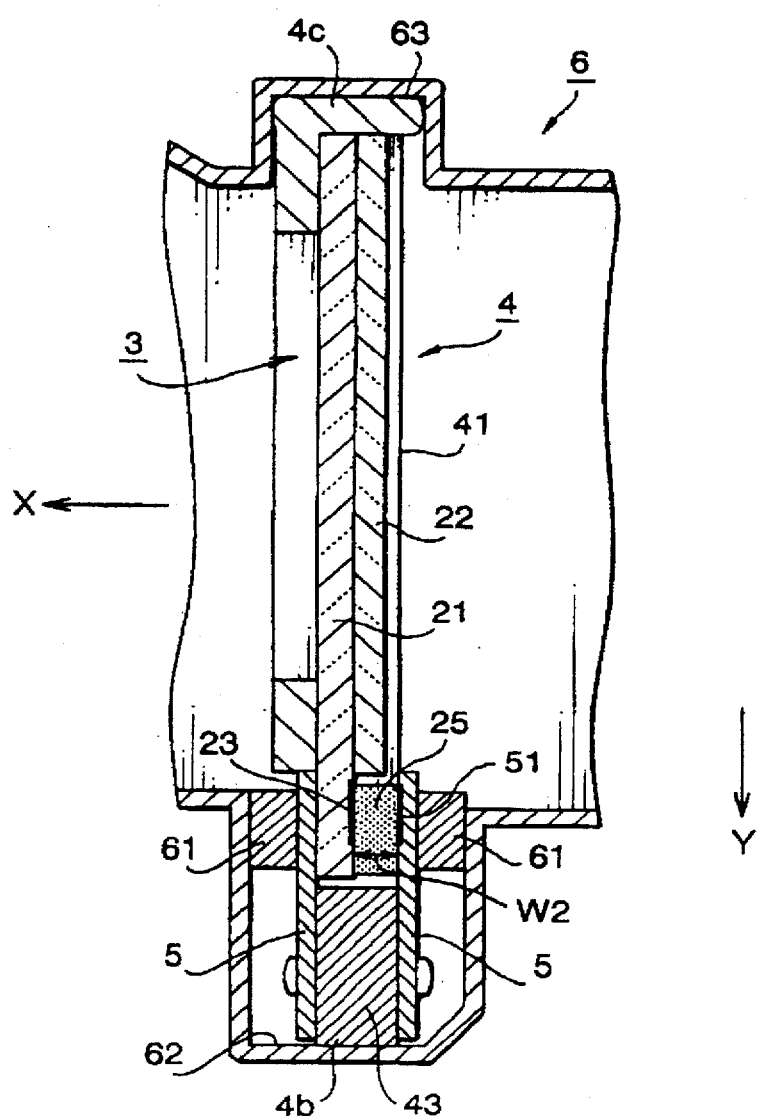
FIG. 7 is a sectional view of the mounting portion.

FIG. 7 is a sectional view of the mounting portion with supporting member 4 being mounted, taken along the line VII—VII of the FIG. 6. As shown in FIG. 7, the display panel 2 and the FPC board 5 are partially overlapped so that the input terminal 23 and the connecting terminal 51 face each other, with the cushion 25 placed therebetween. Further, the overlapping portions of the display panel 2 and the FPC board 5 are sandwiched by the slit 61.

The input terminal 23, the cushion 25 and the connecting terminal 51 are pressed in the slit 61 so that the cushion 25 is changed to W2 from W1 (FIG. 5). That is, the input terminal 23, the cushion 25 and the connecting terminal 51 are firmly contact each other. Accordingly, the input terminal 23 is electrical connected to the connecting terminal.

The lateral side portion 4c of the supporting member 4 fit into the guide groove 63, and the side end surface of the lateral side portion 4b meets a wall of the groove 62. Further, the bottom of the supporting member 4 is supported on a base plate 64 (FIG. 6). Thus, the position of the supporting member 4 with respect to the mounting portion 6 is determined by the guide grooves 62 and 63, the base plate 4 and the slit 5.

As described above, according to the embodiment, the input terminal 23 of the LCD panel 2 and the connecting terminal 51 of the FPC board 5 are electrically connected in a simple manner. Further, the LCD panel 2 and the finder frame 3 can be easily mounted in the finder system 1. Therefore, the assembling operation is simplified.

The present disclosure relates to a subject matter contained in Japanese Patent Application No. HEI 8-23087, filed on Jan. 16, 1996, which is expressly incorporated herein in its entirety.

What is claimed is:

1. A display system in a finder, comprising:

a display panel which displays information, said display panel having an input terminal;

a supporting member which supports said display panel;

a flexible printed circuit board having a connecting terminal;

a cushion, said cushion comprising insulating portions and conductive portions in a predetermined pattern; and a finder casing having a slit in which said supporting member is mounted to said finder casing, said finder casing including a bottom positioning member which abuts an end of said supporting member received within said slit, and lateral positioning members which abut lateral sides of said supporting member, wherein said display panel and said printed circuit board partially overlap each other so that said input terminal and said connecting terminal face each other with said cushion disposed between said input terminal and said connecting terminal, and wherein insertion of said supporting member into said slit positions said display panel at a predetermined position and electrically connects said input terminal and said connecting terminal by pressing, in said slit, said overlapping portions of said display panel and said flexible printed circuit board.

2. The display system according to claim 1, wherein said flexible printed circuit board is bent to overlap an opposite surface of said display panel with respect to said input terminal.

3. The display system according to claim 2, wherein said overlapping portions are inserted into said slit at a bent portion of said flexible printed circuit board.

4. The display system according to claim 1, said supporting member supporting said display panel and said flexible printed circuit board in such a manner that said input terminal and said connecting terminal face each other.

5. The display system according to claim 4, wherein said supporting member includes:

a plate, said flexible printed circuit board being attached to a surface of said plate; and a panel frame for supporting said display panel substantially in a same plane as said plate, so that said input terminal is positioned adjacent to said plate.

6. The display system according to claim 5, wherein said flexible printed circuit board is bent at an end of said plate to overlap both surfaces of said plate.

7. The display system according to claim 5, wherein said display panel is placed into said panel frame.

8. The display system according to claim 5, wherein said panel frame includes at least one bar extending from an end of said plate in parallel with said panel.

9. The display system according to claim 5, wherein at least one hooking member is provided to said plate, and attaches said flexible printed circuit board to said plate.

10. The display system according to claim 5, further comprising a positioning device which positions said flexible printed circuit board with respect to said plate.

11. The display system according to claim 10, wherein said positioning device includes at least one boss disposed on said plate and at least one hole formed in said flexible printed circuit board which engages said boss.

12. The display system according to claim 5, wherein a finder frame is unitarily formed with said panel frame.

13. The display system according to claim 12, wherein said finder frame extends parallel to said plate.

14. The display system according to claim 13, wherein said finder frame faces and directly contacts said display panel.

15. The display system according to claim 1, wherein said display panel is a liquid crystal display panel.

16. The display system according to claim 1, wherein said cushion is a rectangular material having insulating layers and conductive layers alternately provided in the longitudinal direction of said rectangular material.

17. A display system in a finder, comprising:

an LCD panel which displays information, said LCD panel having an input terminal;

a flexible printed circuit board having a connecting terminal;

a cushion, said cushion comprising insulating portions and conductive portions in a predetermined pattern;

a supporting member for supporting said LCD panel and said flexible printed circuit board such that said LCD panel and said flexible printed circuit board partially overlap each other, and such that said input terminal and said connecting terminal face each other with said cushion disposed between said input terminal and said connecting terminal;

a finder casing having a slit in which said LCD panel is mounted to said finder casing, said finder casing including a bottom positioning member which abuts an end of said supporting member received within said slit, and lateral positioning members which abut lateral sides of said supporting member, wherein insertion of said supporting member into said slit positions said LCD panel at a predetermined position and electrically connects said input terminal and said connecting terminal by pressing, in said slit, said overlapping portions of said LCD panel and said flexible printed circuit board.

18. The display system according to claim 17, wherein said flexible printed circuit board is bent to overlap the opposite surface of said LCD panel with respect to said input terminal.

19. The display system according to claim 18, wherein said overlapping portions are inserted into said slit at a bent portion of said flexible printed circuit board.

20. The display system according to claim 18, wherein said supporting member includes:

a plate, said flexible printed circuit board being attached to a surface of said plate;

a panel frame which supports said LCD panel substantially in a plane parallel to said plate so that said input terminal is adjacent to said plate; and a finder frame unitarily provided to said panel frame.

21. The display system according to claim 20, wherein said panel frame includes at least one bar extending from a side end of said plate in parallel with said panel.

22. The display system according to claim 21, wherein said finder frame is unitarily formed with said bar.

23. A method for electrically connecting a display panel and a flexible printed circuit board within a finder system of a camera, the finder system including a cushion comprising insulating portions and conductive portions in a predetermined pattern, said finder system including a supporting member which supports said display panel, and a finder casing having a slit in which said display panel is mounted to said finder casing, said finder casing including a bottom positioning member which abuts an end of said supporting member received within said slit and lateral positioning members which abut lateral sides of said supporting member, said method comprising:

supporting said display panel and a flexible printed circuit board such that said display panel and said flexible printed circuit board partially overlap each other such that an input terminal of said display panel faces a connecting terminal of said flexible printed circuit board with said cushion placed between said input terminal and said connecting terminal; and inserting said supporting member into said slit such that said overlapping portions of said display panel and said flexible printed circuit board, said input terminal, said cushion and said connecting terminal are pressed within said slit to firmly contact each other to electrically connect said input terminal and said connecting terminal.

24. The method according to claim 23, wherein said supporting step includes:

mounting said display panel to a mounting member; and attaching said flexible printed circuit board to said supporting member.

* * * * *

UNITED STATES PATENT AND TRADEMARK OFFICE
CERTIFICATE OF CORRECTION

PATENT NO. : 5,740,482
DATED : April 14, 1998
INVENTOR(S) : Masahiro INAZUKA

It is certified that error appears in the above-identified patent and that said Letters Patent is hereby corrected as shown below:

On the title page, item [57] Abstract, please insert the following for the Abstract shown in the patent :

---ABSTRACT

A liquid crystal display (LCD) panel for displaying information in finder and which has an input terminal. A flexible printed circuit (FPC) board is used to connect the input terminal and a driving circuit. The LCD panel and the FPC board partially overlap each other so that the terminals of the LCD panel and the FPC board face each other with a cushion inserted between the LCD panel and the FPC board. The cushion includes insulating portions and conductive portions. The overlapping portion of the LCD panel and the terminal are inserted into a slit so that the LCD panel, the cushion and FPC board firmly contact each other. Thus, the display panel and the FPC board are electrically connected.---

Signed and Sealed this

Eighteenth Day of May, 1999

*Attest:*

Q. TODD DICKINSON

*Attesting Officer*  *Acting Commissioner of Patents and Trademarks*